(12) United States Patent
Iijima

(10) Patent No.: US 12,270,909 B2
(45) Date of Patent: Apr. 8, 2025

(54) DETECTION METHOD AND DETECTION SYSTEM

(71) Applicant: SEIKO EPSON CORPORATION, Tokyo (JP)

(72) Inventor: Yutaro Iijima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 317 days.

(21) Appl. No.: 17/827,057

(22) Filed: May 27, 2022

(65) Prior Publication Data

US 2022/0390609 A1 Dec. 8, 2022

(30) Foreign Application Priority Data

May 31, 2021 (JP) .................................. 2021-091205

(51) Int. Cl.
*G01S 17/89* (2020.01)
*G01S 17/42* (2006.01)
*G01S 17/86* (2020.01)

(52) U.S. Cl.
CPC ............. *G01S 17/89* (2013.01); *G01S 17/42* (2013.01); *G01S 17/86* (2020.01)

(58) Field of Classification Search
CPC .......... G01S 17/89; G01S 17/86; G01S 17/42
See application file for complete search history.

(56) References Cited

U.S. PATENT DOCUMENTS

| 2014/0340487 | A1* | 11/2014 | Gilliland | .............. | G01S 7/4863 348/48 |
| 2022/0057518 | A1* | 2/2022 | Brenner | ................ | G01S 17/894 |

FOREIGN PATENT DOCUMENTS

| JP | 2005-325537 A | 11/2005 |
| JP | 2014-142288 A | 8/2014 |
| JP | 2017-096817 A | 6/2017 |
| WO | 13/190772 A1 | 12/2013 |
| WO | 2019/198446 A1 | 10/2019 |
| WO | 2020/013021 A1 | 1/2020 |

OTHER PUBLICATIONS

Characteristics of Each 3D Sensor, (Jul. 20, 2017-Jun. 19, 2018), pp. 1-8.
Characteristics of Each 3D Sensor, http://www.sanko-shoko.net/note.php?id=jvzy, (Jul. 20, 2017-Jun. 19, 2018), pp. 1-8.
Itagaki, Asako, "No. 159 Technology of Depth Image Sensor to Measure "Depth" of Photographs", https://www.tdk.com/ja/tech-mag/knowledge/159, pp. 1-8, (Jan. 24, 2022).
What is ToF Camera?—What You Can Do with a ToF Camera, https://www.inrevium.com/pickup/tofcamera/, (Jan. 24, 2022), pp. 1-6.

* cited by examiner

*Primary Examiner* — Mohamed Charioui
*Assistant Examiner* — Xiuqin Sun
(74) *Attorney, Agent, or Firm* — Oliff PLC

(57) ABSTRACT

A detection method includes acquiring three-dimensional coordinate values of at least two points in a second area included in a first area, based on measured values acquired by measuring the first area by an infrared distance measuring sensor, the second area is smaller than the first area, calculating a position of a plane including the second area, based on the three-dimensional coordinate values of the at least two points, and deciding the position of the plane as a three-dimensional shape of the first area.

8 Claims, 11 Drawing Sheets

DETECTION METHOD AND DETECTION SYSTEM

The present application is based on, and claims priority from JP Application Serial Number 2021-091205, filed May 31, 2021, the disclosure of which is hereby incorporated by reference herein in its entirety.

BACKGROUND

1. Technical Field

The present disclosure relates to a detection method and a detection system.

2. Related Art

According to the related art, a technique of acquiring the three-dimensional shape of a detection area, using an infrared distance measuring sensor, is known.

For example, WO2020-013021 discloses a method of acquiring three-dimensional coordinate point cloud data of a floor surface by a depth sensor and estimating a plane representing the floor surface, for example, by using the least-squares method, based on a plurality of point cloud data that are acquired.

In WO2020-013021, it is assumed that the three-dimensional coordinates of the floor surface can be accurately acquired by the depth sensor. However, for example, when an infrared distance measuring sensor is used, the three-dimensional coordinate values may not be able to be acquired with sufficient accuracy due to the reflection characteristic of the floor surface.

SUMMARY

An aspect of the present disclosure is directed to a detection method of detecting a three-dimensional shape of a first area by an infrared distance measuring sensor. The first area includes a second area that is smaller than the first area. The detection method includes: acquiring three-dimensional coordinate values of at least two points in the second area, based on a measured value by the distance measuring sensor; calculating a position of a plane including the second area, based on the three-dimensional coordinate values of the at least two points; and deciding the position of the plane as the three-dimensional shape of the first area.

Another aspect of the present disclosure is directed to a detection system including an infrared distance measuring sensor and an information processing device and detecting a three-dimensional shape of a first area. The first area includes a second area that is smaller than the first area. The information processing device executes: acquiring three-dimensional coordinate values of at least two points in the second area, based on a measured value by the distance measuring sensor; calculating a position of a plane including the second area, based on the three-dimensional coordinate values of the at least two points; and deciding the position of the plane as the three-dimensional shape of the first area.

DESCRIPTION OF EXEMPLARY EMBODIMENTS

Embodiments of the present disclosure will now be described with reference to the drawings. The embodiments include a first embodiment described with reference to FIGS. 1 to 9 and a second embodiment described with reference to FIGS. 10 and 11.

Figure 1:
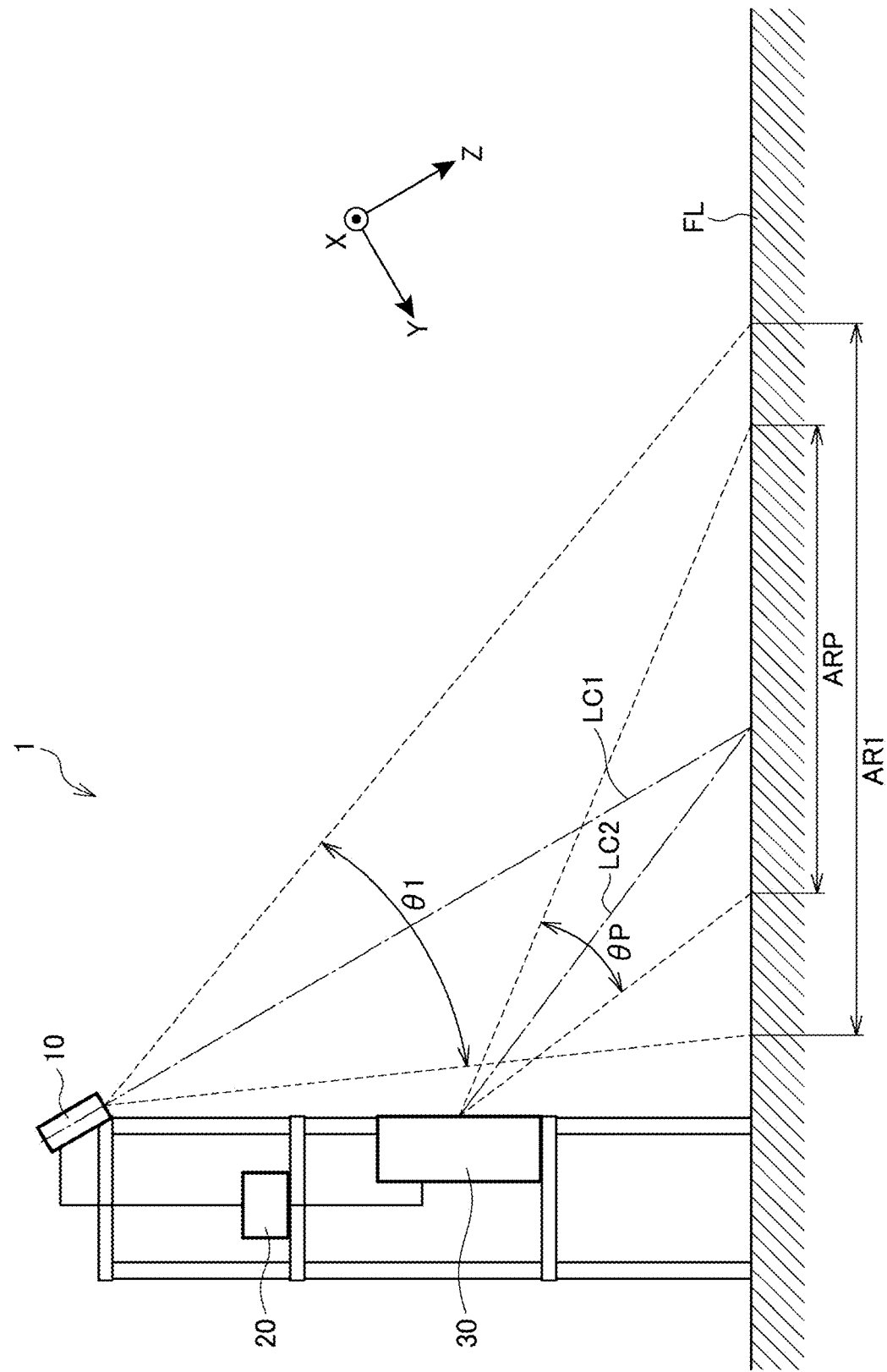
FIG. 1 shows an example of the configuration of a detection system according to a first embodiment.

FIG. 1 shows an example of the configuration of a detection system 1 according to the first embodiment.

The detection system 1 has a detection device 10, a personal computer 20, and a projector 30.

The personal computer 20 is communicatively coupled to each of the detection device 10 and the projector 30.

The personal computer 20 is communicatively coupled to the detection device 10, for example, via a USB (universal serial bus) cable. The personal computer 20 is also communicatively coupled to the projector 30 via an HDMI (trademark registered) (high-definition multimedia interface) cable.

Figure 2:
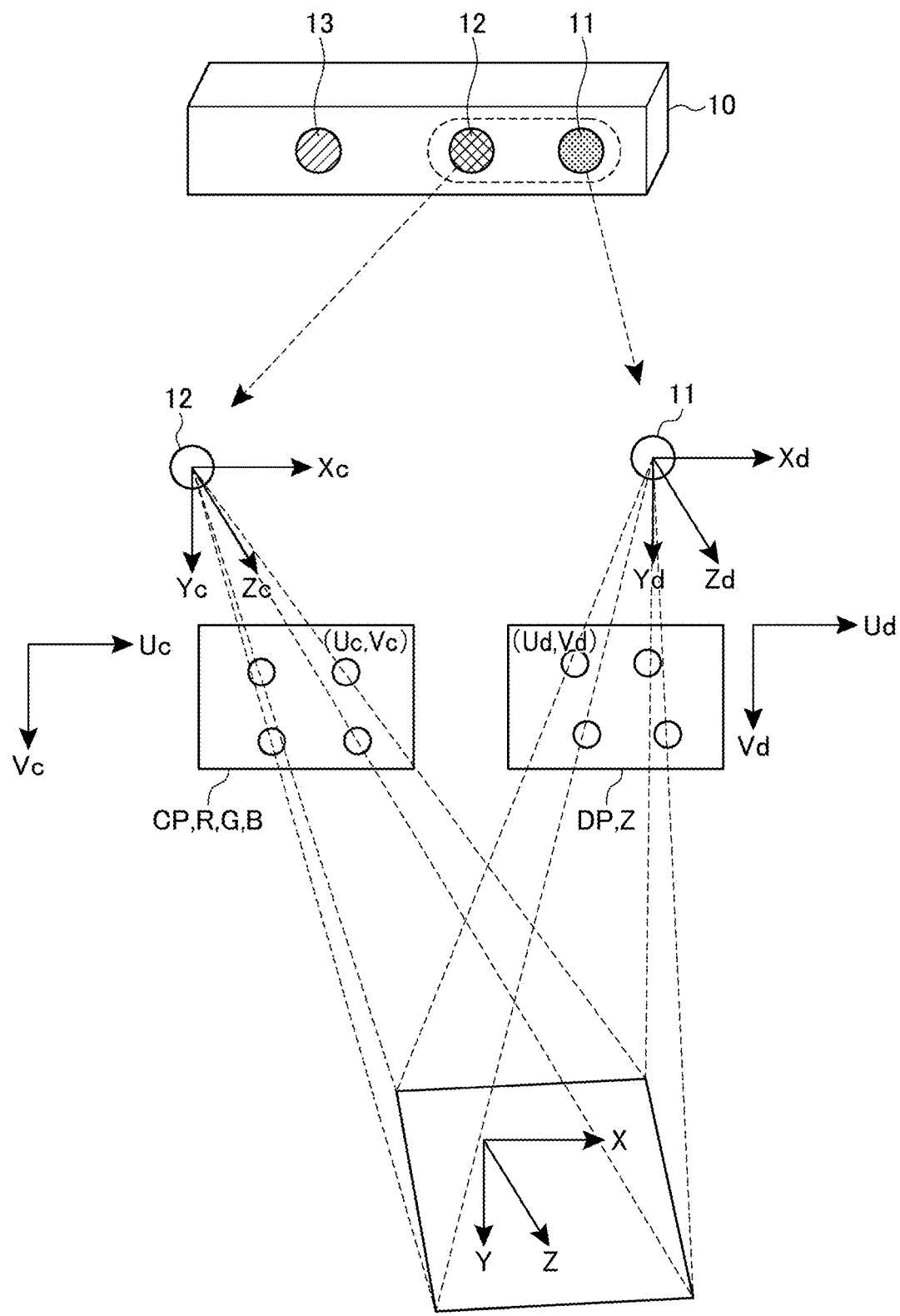
FIG. 2 shows the correspondence between camera coordinates of a depth camera and an RGB camera.

The detection device 10 has an infrared distance measuring sensor. In this embodiment, the detection device 10 is formed by an RGB-D (depth) camera. As shown in FIG. 2, the detection device 10 has a depth camera 11, an RGB camera 12, and an infrared projector 13.

The infrared projector 13 casts infrared light onto an object.

The depth camera 11 measures reflected light of the infrared light cast by the infrared projector 13 and thus acquires a depth image DP in which the correspondence between a depth value (Z-coordinate) and coordinates (Ud, Vd) of the depth camera 11 is established, by a so-called ToF (time-of-flight) method. An X-axis is parallel to a Ud-axis. A Y-axis is parallel to a Vd-axis. The X-axis, the Y-axis, and the Z-axis are orthogonal to each other.

The RGB camera 12 acquires an RGB image CP of the object.

The depth image DP, the Ud-axis, the Vd-axis, and the RGB image CP will be described with reference to FIG. 2.

The infrared projector 13 and the depth camera 11 are equivalent to an example of the "infrared distance measuring sensor".

The depth image DP is equivalent to an example of a "measured value by the distance measuring sensor".

In this embodiment, a case where the "infrared distance measuring sensor" is formed by the infrared projector 13 and the depth camera 11 of the RGB-D camera is described. However, this is not limiting.

The "infrared distance measuring sensor" may be formed by a stereo vision including two IR (infrared) cameras. In the stereo vision, the correspondence between the coordinates of positions corresponding to each other in two picked-up images needs to be established. However, it is difficult to accurately specify the positions of points corresponding to each other in picked-up images and therefore measurement accuracy may be unstable. To cope with this, a specific marker may be arranged at a floor surface FL or the like and positions corresponding to each other between two picked-up images may be specified. As the specific marker, a retroreflective material can be suitably used.

The "infrared distance measuring sensor" may also be formed by a structured light having an IR camera and an IR projector.

The personal computer 20 acquires the depth image DP from the detection device 10. The personal computer 20 detects the three-dimensional shape of a first area AR1, based on the depth image DP.

An angle of field of view el represents the field of view of the depth camera 11 corresponding to the first area AR1. A center line LC1 indicates the center of the field of view of the depth camera 11. The center line LC1 is parallel to the Z-axis.

The personal computer 20 is equivalent to an example of an "information processing device".

The projector 30 projects image light onto the floor surface FL and forms a projection image in a projection area ARP on the floor surface FL, based on an instruction from the personal computer 20. An angle of projection θP represents the angle of divergence at which the projector 30 projects the image light toward the projection area ARP on the floor surface FL.

The projection area ARP is included in the first area AR1. A center line LC2 indicates the center of projection light projected by the projector 30.

As shown in FIG. 1, the detection device 10 and the projector 30 are arranged in such a way that the position of a point of intersection between the center line LC2 and the floor surface FL coincides, for example, with the position of a point of intersection between the center line LC1 and the floor surface FL.

FIG. 2 shows the correspondence between camera coordinates of the depth camera 11 and the RGB camera 12.

The detection device 10, that is, the RGB-D camera, acquires the RGB image CP acquired by the RGB camera 12, the depth image DP acquired by the depth camera 11, and three-dimensional XYZ-coordinates, and can generate point cloud data having six-dimensional data (R, G, B, X, Y, Z) with color information.

The RGB camera 12 and the depth camera 11 are separate devices. Therefore, the coordinate systems of these cameras usually do not coincide with each other. To generate point cloud data with color information, the correspondence between the pixel coordinate systems of the RGB image CP from the RGB camera 12 and the depth image DP from the depth camera 11 is needed.

As for the correspondence between the pixel coordinate systems, for example, a default value is prepared by a commercially available SDK (software development kit) or an external library and can be acquired using an API (application programming interface).

For example, as shown in FIG. 2, when a point (Ud, Vd) in the depth image DP and a corresponding depth value (Z-coordinate) are inputted, a corresponding point (Uc, Vc) in the RGB image CP is acquired. The Ud-axis is parallel, for example, to the direction of the long side of the depth image DP. The Vd-axis is parallel, for example, to the direction of the short side of the depth image DP. The Uc-axis is parallel, for example, to the direction of the long side of the RGB image CP. The Vc-axis is parallel, for example, to the direction of the short side of the RGB image CP.

When a commercially available RGB-D camera having the RGB camera 12 and the depth camera 11 installed as an integrated unit is used, the correspondence between the pixel coordinate systems of the RGB image CP and the depth image DP can be established by using a default value prepared by the manufacturer, without separately performing an operation such as calibration of an external parameter.

Figure 3:
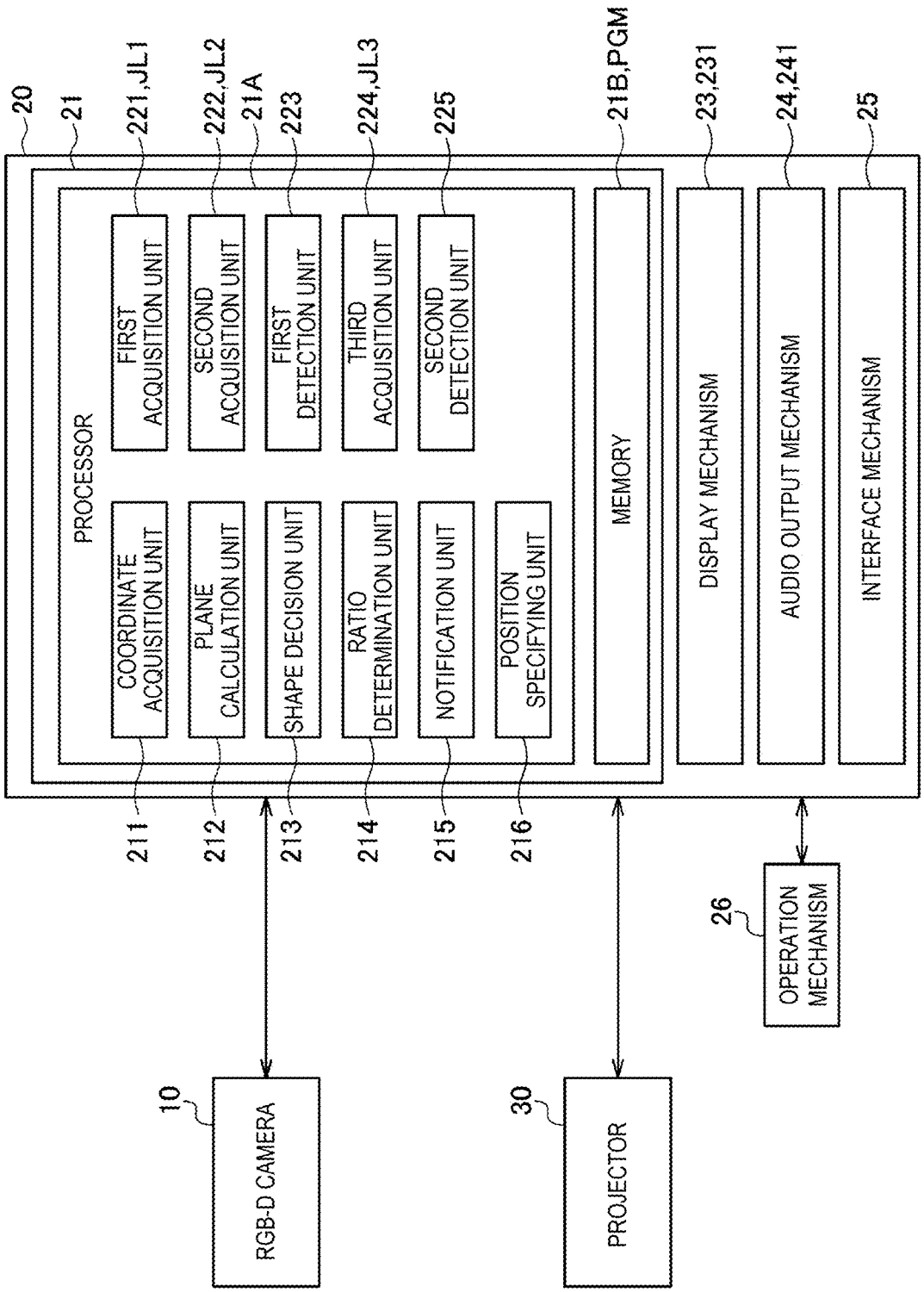
FIG. 3 shows an example of the configuration of a personal computer.

FIG. 3 shows an example of the configuration of the personal computer 20.

The personal computer 20 has a control unit 21, a display mechanism 23, an audio output mechanism 24, and an interface mechanism 25. The control unit 21 is communicatively coupled to an operation mechanism 26.

The display mechanism 23 has a display panel 231 displaying various images under the control of the control unit 21. The display panel 231 includes an LCD (liquid crystal display), for example. The display panel 231 is formed in a rectangular shape.

The audio output mechanism 24 has a speaker 241 outputting various sounds under the control of the control unit 21.

The interface mechanism 25 is a communication interface executing data communication with an external device including the detection device 10 and the projector 30 and is, for example, a wired communication interface conforming to the HDMI (trademark registered) standard and the USB standard. The interface mechanism 25 is, for example, an interface board having a connector and an interface circuit and is coupled to a main board where a processor 21A or the like of the control unit 21 is mounted. Alternatively, the connector and the interface circuit that form the interface mechanism 25 are mounted on the main board of the control unit 21.

The operation mechanism 26 accepts an operation from a user, generates an operation signal, and outputs the operation signal to the control unit 21. The operation mechanism 26 has a keyboard and a mouse, for example.

The control unit 21 has the processor 21A and a memory 21B and controls each part of the personal computer 20. The memory 21B is a storage device storing a program executed by the processor 21A and data in a non-volatile manner. The memory 21B is formed by a magnetic storage device, a semiconductor memory device such as a flash ROM (read-only memory), or other types of non-volatile storage devices.

The memory 21B may include a RAM (random-access memory) forming a work area for the processor 21A. The memory 21B stores data processed by the control unit 21 and a control program PGM executed by the processor 21A.

The processor 21A may be formed by a single processor. Alternatively, a configuration where a plurality of processors function as the processor 21A may be employed. The processor 21A executes the control program and controls each part of the personal computer 20.

The control unit 21 has a coordinate acquisition unit 211, a plane calculation unit 212, a shape decision unit 213, a ratio determination unit 214, a notification unit 215, a position specifying unit 216, a first acquisition unit 221, a second acquisition unit 222, a first detection unit 223, a third acquisition unit 224, and a second detection unit 225. Specifically, the processor 21A of the control unit 21 executes the control program PGM stored in the memory 21B and thus functions as the coordinate acquisition unit 211, the plane calculation unit 212, the shape decision unit 213, the ratio determination unit 214, the notification unit 215, the position specifying unit 216, the first acquisition unit 221, the second acquisition unit 222, the first detection unit 223, the third acquisition unit 224, and the second detection unit 225.

The configuration of the control unit 21 will now be described with reference to FIG. 3 and FIGS. 4 to 7.

Figure 4:
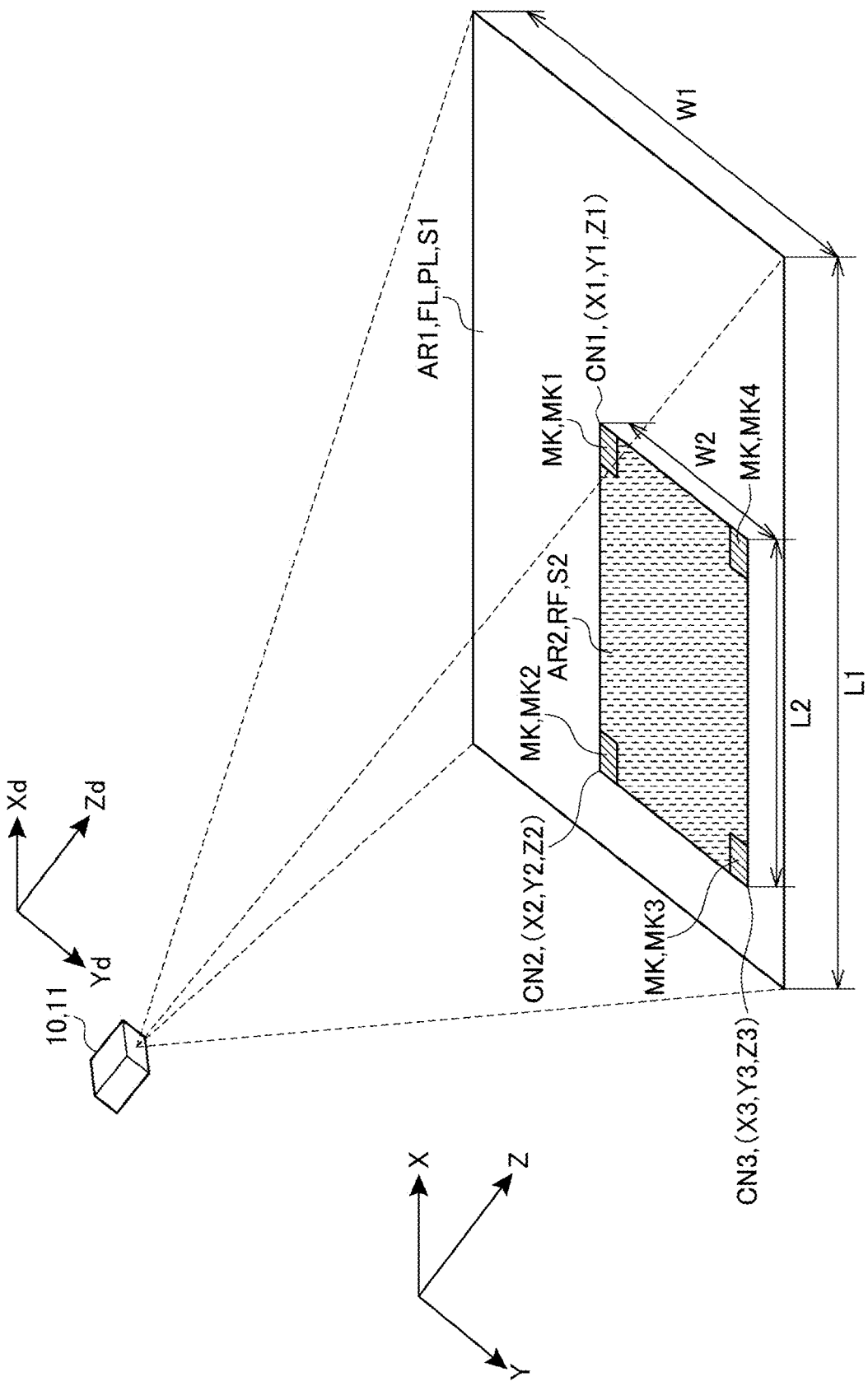
FIG. 4 shows an example of a method for detecting the three-dimensional shape of a first area.

FIG. 4 shows an example of a method for detecting the three-dimensional shape of the first area AR1.

As shown in FIG. 4, the first area AR1 includes a second area AR2 that is smaller than the first area AR1. The second area AR2 is an area where a reflector RF reflecting infrared light is installed by the user.

The reflector RF is an object reflecting infrared light, for example, a piece of white cloth.

In this embodiment, the case where the reflector RF is a piece of white cloth is described. However, this is not limiting. The reflector RF may be any object reflecting infrared light. The reflector RF may be, for example, a thin plate-like object with a surface coated with an infrared-reflecting paint.

In the second area AR2, a marker MK specifying the second area AR2 is arranged. The marker MK is formed in a specific color, for example. The marker MK is formed in red, for example.

The position specifying unit 216 acquires the RGB image CP from the RGB camera 12 and specifies a position corresponding to the second area AR2 in the RGB image CP. The position specifying unit 216 detects the red marker MK in the RGB image CP and thus specifies the position corresponding to the second area AR2.

The RGB image CP is equivalent to an example of the "picked-up image".

The position specifying unit 216 may accept an operation designating a measured value corresponding to the second area AR2 in the depth image DP via the operation mechanism 26 and specify the position corresponding to the second area AR2. For example, the position specifying unit 216 may specify the position corresponding to the second area AR2 in the depth image DP, based on an operation by the user designating positions in the depth image DP corresponding to the four corners of the second area AR2.

When the position specifying unit 216 accepts the operation by the user designating the measured value corresponding to the second area AR2 in the depth image DP via the operation mechanism 26, the marker MK specifying the second area AR2 may not be arranged in the second area AR2.

The depth image DP is equivalent to an example of a "measured value of the first area by the distance measuring sensor".

In this embodiment, the second area AR2 is formed in a rectangular shape and the marker MK includes a first marker MK1, a second marker MK2, a third marker MK3, and a fourth marker MK4. The first to fourth markers MK1 to MK4 are arranged in the four corners of the second area AR2, respectively.

As shown in FIG. 4, a first length L1 representing the length in the X-axis direction of the first area AR1 is longer than a second length L2 representing the length in the X-axis direction of the second area AR2. A first width W1 representing the width in the Y-axis direction of the first area AR1 is longer than a second width W2 representing the width in the Y-axis direction of the second area AR2.

The coordinate acquisition unit 211 acquires the three-dimensional coordinate values of two points in the second area AR2, based on the depth image DP.

In this embodiment, for example, the three-dimensional coordinate values of a first corner CN1, which is the corner of the second area AR2 where the first marker MK1 is arranged, and a second corner CN2, which is the corner of the second area AR2 where the second marker MK2 is arranged, are acquired.

The depth image DP is equivalent to an example of the "measured value by the distance measuring sensor".

In this embodiment, the case where the marker MK is arranged in the four corners of the second area AR2 is described. However, this is not limiting. The marker MK may be arranged in such a way as to be able to specify the second area AR2 in the RGB image CP. For example, the marker MK may be arranged at the center of the second area AR2.

The plane calculation unit 212 calculates the position of a plane PL including the second area AR2, based on the three-dimensional coordinate values of the two points in the second area AR2.

The plane PL is prescribed by the following equation (1):

$$Z = ((Z2-Z1)/(Y2-Y1)) \times Y \qquad (1).$$

In this example, (X1, Y1, Z1) represents the (X, Y, Z) coordinate values of the first corner CN1 and (X2, Y2, Z2) represents the (X, Y, Z) coordinate values of the second corner CN2.

When the Xd-axis of the depth camera 11 is parallel to the X-axis and the Yd-axis of the depth camera 11 is parallel to the Y-axis, the plane PL prescribed by the equation (1) coincides with the plane including the second area AR2. In other words, when the depth camera 11 is arranged at a proper angle of rotation in relation to the centerline LC1, the plane PL is prescribed by the equation (1).

The shape decision unit 213 decides the position of the plane PL as the three-dimensional shape of the first area AR1.

In this embodiment, the case where the position of the plane PL including the second area AR2 is calculated, based on the three-dimensional coordinate values of two points in the second area AR2, is described. However, this is not limiting. The plane calculation unit 212 may calculate the position of the plane PL including the second area AR2, based on the three-dimensional coordinate values of at least two points in the second area AR2.

For example, the plane calculation unit 212 may calculate the position of the plane PL including the second area AR2, based on the three-dimensional coordinate values of three points in the second area AR2.

In this case, the plane PL is prescribed by the following equation (2):

$$Z1 - Z = \frac{\{(Y2-Y1)(Z3-Z1) - (Z2-Z1)(Y3-Y1)\}(X-X1) +}{(X2-X1)(Y3-Y1) - (Y2-Y1)(X3-X1)} \qquad (2)$$

In this example, (X3, Y3, Z3) represents the (X, Y, Z) coordinate values of a third corner CN3.

In this embodiment, the case where (X1, Y1, Z1), (X2, Y2, Z2), and (X3, Y3, Z3) represent the (X, Y, Z) coordinate values of the first corner CN1, the second corner CN2, and the third corner CN3, respectively, is described. However, this is not limiting.

When the plane PL is prescribed by the equation (1), the (X, Y, Z) coordinate values of any two points existing in the second area AR2 and having different (X, Y, Z) coordinate values from each other may be used as (X1, Y1, Z1) and (X2, Y2, Z2).

When the plane PL is prescribed by the equation (2), the (X, Y, Z) coordinate values of any three points existing in the second area AR2 and having different (X, Y, Z) coordinate values from each other may be used as (X1, Y1, Z1), (X2, Y2, Z2), and (X3, Y3, Z3).

Also, for example, the plane calculation unit 212 may calculate the position of the plane PL including the second area AR2, based on the three-dimensional coordinate values of four or more points in the second area AR2. In this case, the position of the plane PL can be calculated by the least-squares method.

In this way, the shape decision unit 213 decides the position of the plane PL as three-dimensional shape of the first area AR1 and therefore can decide the accurate three-dimensional shape of the first area AR1 by simple processing.

The plane calculation unit 212 calculates the position of the plane PL including the second area AR2, based on the three-dimensional coordinate values of two points in the second area AR2, and therefore can calculate the position of the plane PL by simple processing.

The ratio determination unit 214 determines whether the ratio RT of the size of the second area AR2 to the size of the first area AR1 is equal to or lower than a threshold TH, or not.

For example, when the plane calculation unit 212 calculates the position of the plane PL including the second area AR2, based on the three-dimensional coordinate values of the first corner CN1 and the second corner CN2 of the second area AR2, the size of the first area AR1 is the first length L1, for example, and the size of the second area AR2 is the second length L2, for example. The first length L1 is the length in the X-axis direction of the first area AR1. The second length L2 is the length in the X-axis direction of the second area AR2.

In this case, the ratio RT is found by the following equation (3):

$$RT = L2/L1 \tag{3}$$

In this case, the threshold TH is 0.2, for example.

Also, for example, when the plane calculation unit 212 calculates the position of the plane PL including the second area AR2, based on the three-dimensional coordinate values of the first corner CN1, the second corner CN2, and the third corner CN3 of the second area AR2, the size of the first area AR1 is a first area size S1, for example, and the size of the second area AR2 is a second area size S2, for example. The first area size S1 is the area size of the first area AR1. The second area size S2 is the area size of the second area AR2.

In this case, the ratio RT is found by the following equation (4):

$$RT = S2/S1 = (L2 \times W2)/(L1 \times W1) \tag{4}$$

In this case, the threshold TH is 0.14, for example.

When the ratio determination unit 214 determines that the ratio RT is equal to or lower than the threshold TH, the notification unit 215 gives a notification prompting the user to install the reflector RF. In other words, when the ratio determination unit 214 determines that the ratio RT is equal to or lower than the threshold TH, the notification unit 215 gives a notification prompting the user to increase the size of the second area AR2.

Also, when the ratio determination unit 214 determines that the ratio RT is equal to or lower than the threshold TH, the notification unit 215 notifies the user of a possibility that the detection accuracy for the three-dimensional shape of the first area AR1 is low.

The notification from the notification unit 215 to the user is executed, for example, by at least one of a display on the display panel 231, an audio output from the audio output mechanism 24, and a display of a projection image by the projector 30.

The first acquisition unit 221 acquires first distance information JL1 representing the three-dimensional shape of the first area AR1, based on the position of the plane PL. The first distance information JL1 corresponds to a first depth image DP1 showing the position of the plane PL. For example, the first acquisition unit 221 generates the depth image DP showing the three-dimensional shape of the first area AR1 decided by the shape decision unit 213, as the first depth image DP1.

The first depth image DP1 will be described further with reference to FIG. 7.

Figure 5:
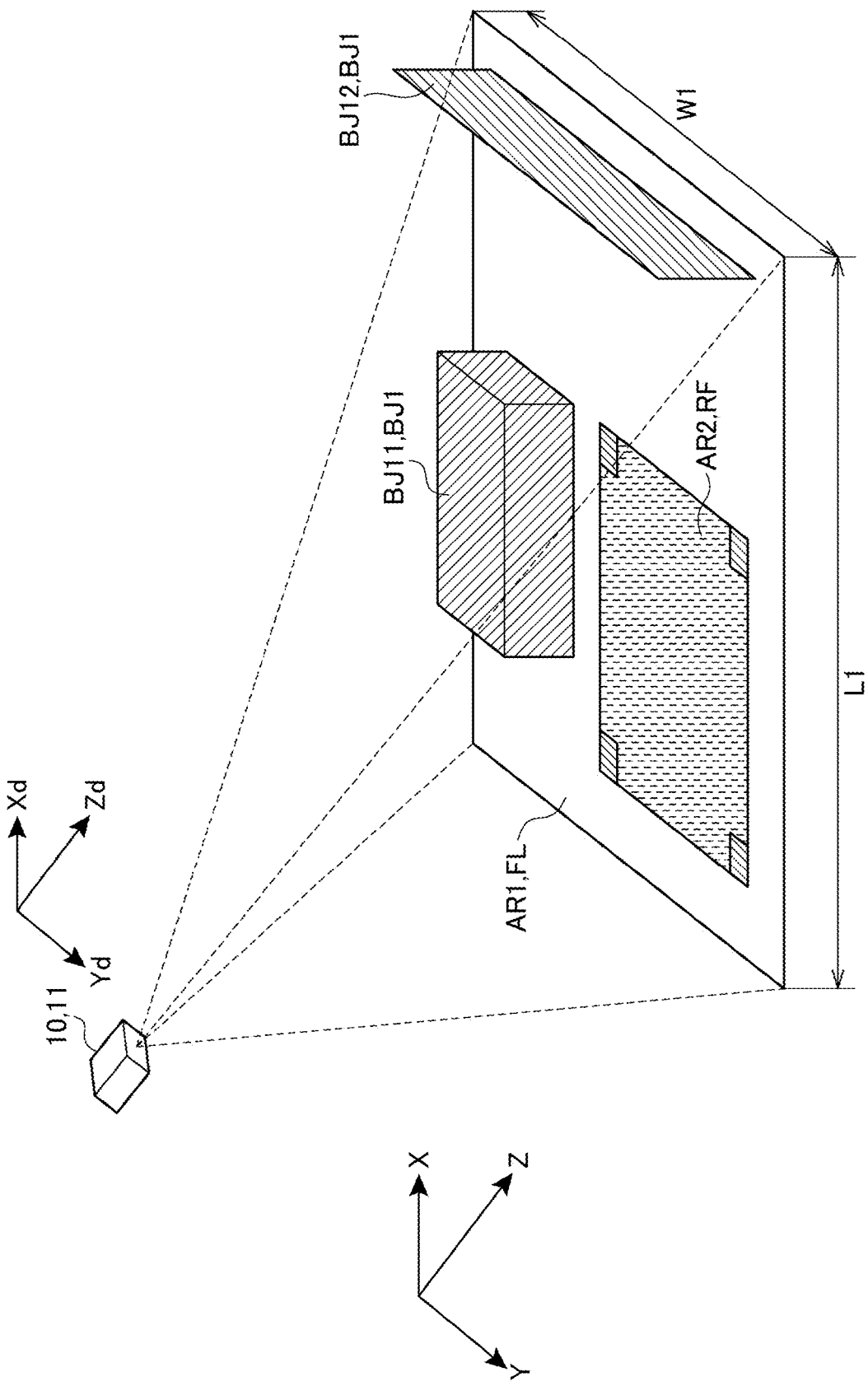
FIG. 5 shows an example of a method for detecting a three-dimensional shape including a first object.

FIG. 5 shows an example of a method for detecting a three-dimensional shape including a first object BJ1.

FIG. 5 differs from FIG. 4 in that the first object BJ1 is arranged on the floor surface FL. In this embodiment, the first object BJ1 includes a rectangular parallelepiped BJ11 and a wall BJ12.

The rectangular parallelepiped BJ11 is placed on the floor surface FL. The wall BJ12 is fixed to the floor surface FL and stands upright in a direction parallel to the vertical direction.

After the first acquisition unit 221 acquires the first distance information JL1, the second acquisition unit 222 acquires second distance information JL2 representing a three-dimensional shape in the first area AR1, based on the depth image DP generated by the depth camera 11.

The depth image DP is equivalent to an example of the "measured value by the distance measuring sensor".

The second distance information JL2 corresponds to a second depth image DP2 generated by the depth camera 11 in the state where the first object BJ1 is arranged on the floor surface FL, as shown in FIG. 5.

The second depth image DP2 will be described further with reference to FIG. 7.

The first detection unit 223 detects the first object BJ1 in the first area AR1, based on the first distance information JL1 and the second distance information JL2.

Specifically, the first detection unit 223 detects the first object BJ1 in the first area AR1, based on the first depth image DP1 and the second depth image DP2.

The processing by the first detection unit 223 will be described further with reference to FIG. 7.

Figure 6:
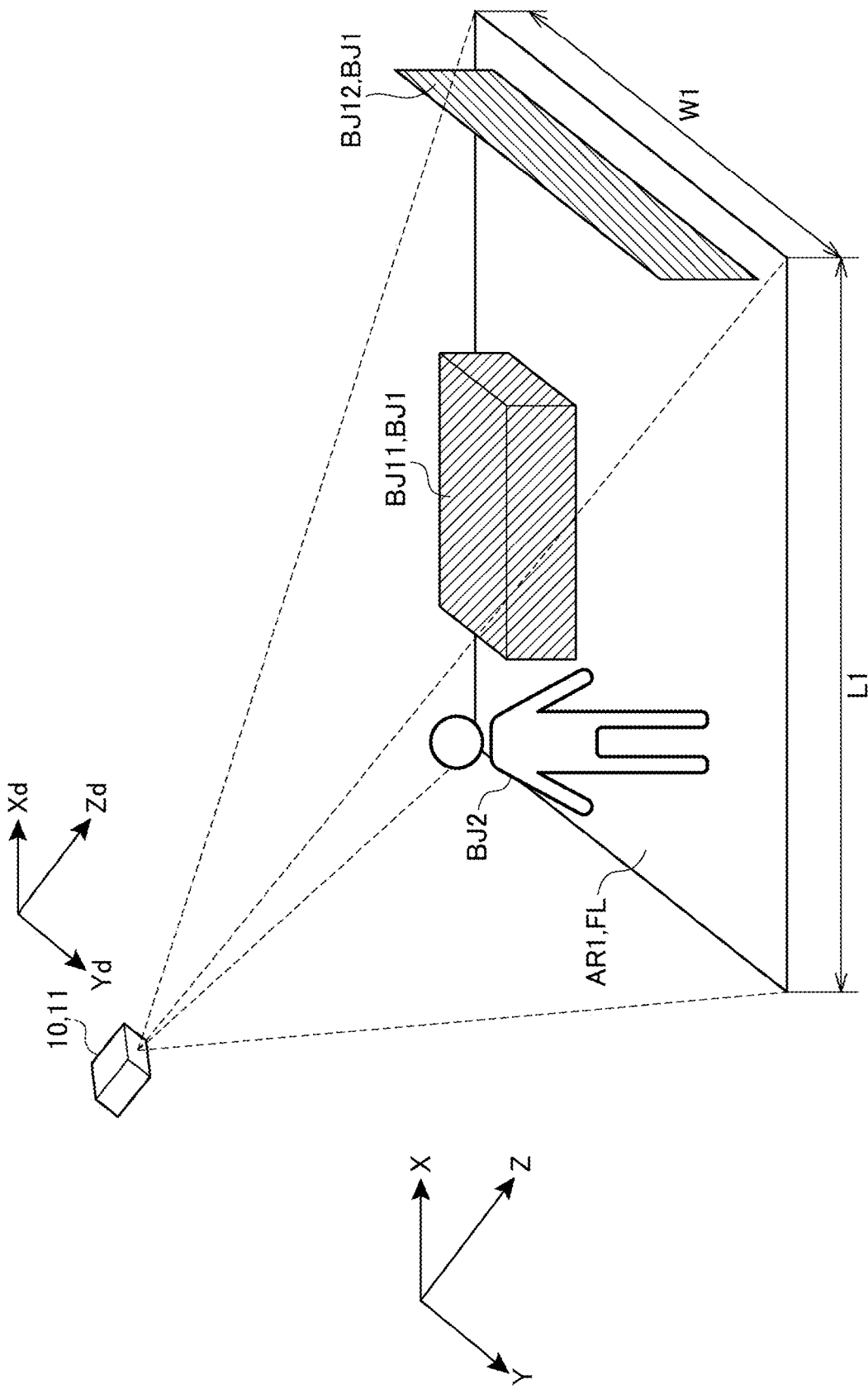
FIG. 6 shows an example of a method for detecting a three-dimensional shape including the first object and a second object.

FIG. 6 shows an example of a method for detecting a three-dimensional shape including the first object BJ1 and a second object BJ2.

FIG. 6 differs from FIG. 5 in that the second object BJ2 is arranged on the floor surface FL. In this embodiment, the second object BJ2 is equivalent to a person who has entered the first area AR1.

After the second distance information JL2 is acquired, the third acquisition unit 224 acquires third distance information JL3 representing a three-dimensional shape in the first area, based on the depth image DP generated by the depth camera 11.

The depth image DP is equivalent to an example of the "measured value by the distance measuring sensor".

The third distance information JL3 corresponds to a third depth image DP3 generated by the depth camera 11 in the state where the first object BJ1 and the second object BJ2 are arranged on the floor surface FL, as shown in FIG. 6.

The third depth image DP3 will be described further with reference to FIG. 7.

The second detection unit 225 detects the second object BJ2 in the first area AR1, based on the second distance information JL2 and the third distance information JL3.

The processing by the second detection unit 225 will be described further with reference to FIG. 7.

When the second detection unit 225 detects the second object BJ2, the notification unit 215 notifies the user that the second object BJ2 is detected. When the second detection unit 225 does not detect the second object BJ2, the notification unit 215 notifies the user that the second object BJ2 is not detected.

Figure 7:
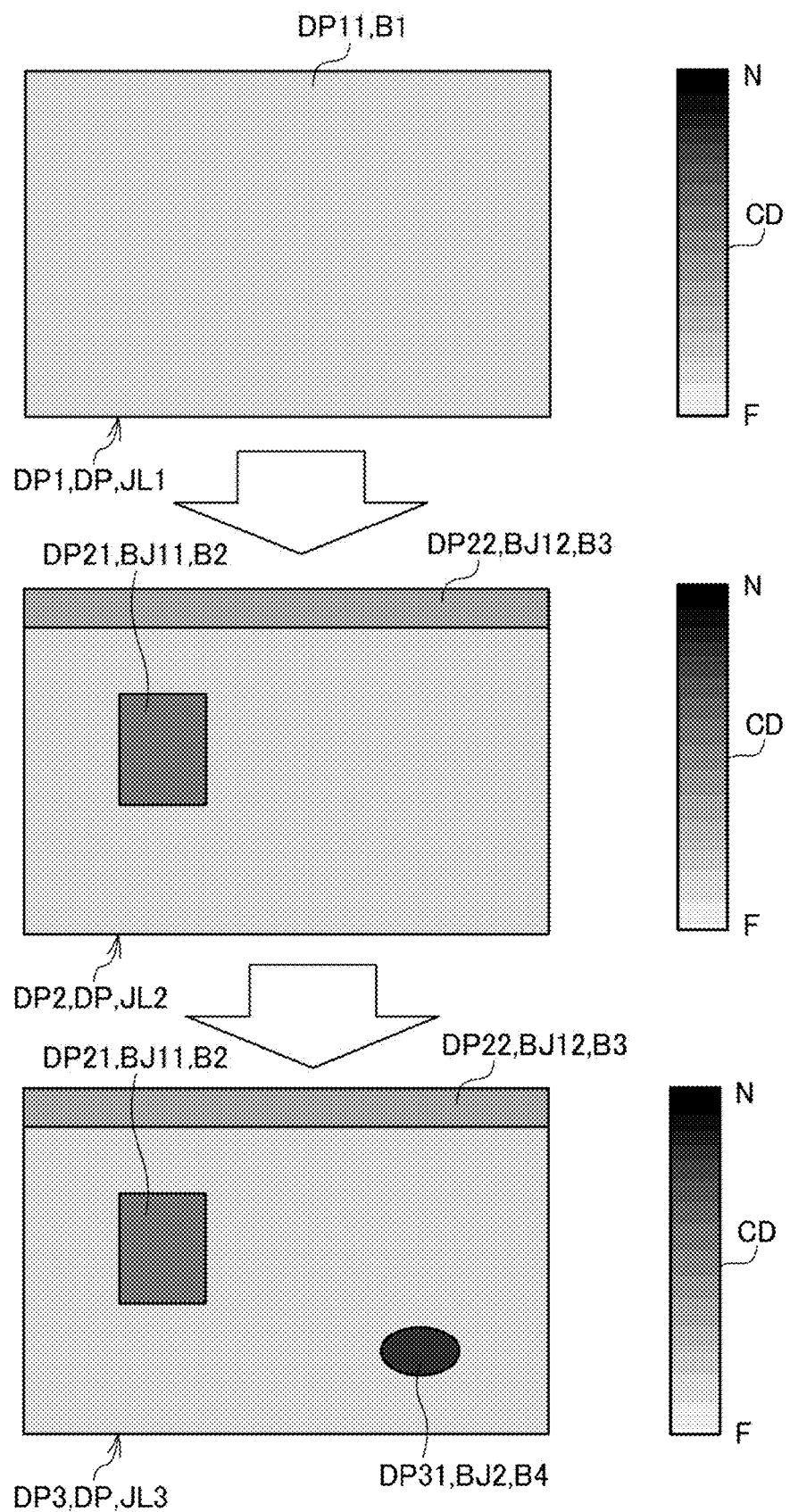
FIG. 7 shows an example of a method for detecting the first object and the second object.

FIG. 7 shows an example of a method for detecting the first object BJ1 and the second object BJ2.

In FIG. 7, the first depth image DP1, the second depth image DP2, and the third depth image DP3 are shown in order from top to bottom.

In FIG. 7, scale images CD corresponding on a one-to-one basis to the first depth image DP1, the second depth image DP2, and the third depth image DP3, and showing the relationship between a depth value (Z-coordinate) and a luminance B of the pixels in the depth image DP, are illustrated. The depth value (Z-coordinate) represents the distance from the depth camera 11.

As shown in the scale images CD, the luminance B of the pixels in the depth image DP becomes higher as the distance from the depth camera 11 becomes longer. In other words, the image density in the depth image DP becomes higher as the distance from the depth camera 11 becomes shorter.

In the first depth image DP1, a floor surface image DP11 with a first luminance value B1 corresponding to the distance from the depth camera 11 to the floor surface FL is displayed.

In the second depth image DP2, a first image DP21 corresponding to the first object BJ1, and a second image DP22, are displayed in addition to the image with the first luminance value B1.

The first image DP21 is an image corresponding to the rectangular parallelepiped BJ11 and is displayed with a second luminance value B2 that is lower than the first luminance value B1.

The second image DP22 is an image corresponding to the wall BJ12 and is displayed with a third luminance value B3 that is lower than the first luminance value B1.

The rectangular parallelepiped BJ11 is closer to the depth camera 11 than the wall BJ12. Therefore, the second luminance value B2 is lower than the third luminance value B3.

The first detection unit 223 detects the first object BJ1 in the first area AR1, based on the first depth image DP1 and the second depth image DP2. In other words, the first detection unit 223 extracts an image with a different luminance value from the first luminance value B1 of the floor surface image DP11, from among the images included in the second depth image DP2, and thus detects the first object BJ1. For example, the first detection unit 223 extracts an image with a lower luminance value than the first luminance value B1 of the floor surface image DP11, from among the images included in the second depth image DP2, and thus detects the first object BJ1.

In this way, the first detection unit 223 can detect the first image DP21 corresponding to the rectangular parallelepiped BJ11 and the second image DP22 corresponding to the wall BJ12.

In the third depth image DP3, a third image DP31 is displayed in addition to the floor surface image DP11, the first image DP21, and the second image DP22.

The third image DP31 is an image corresponding to the second object BJ2 representing a human body and is displayed with a fourth luminance value B4. The second object BJ2 is closer to the depth camera 11 than the first object BJ1. Therefore, the fourth luminance value B4 is lower than the third luminance value B3.

The second detection unit 225 detects the second object BJ2 in the first area AR1, based on the second depth image DP2 and the third depth image DP3. In other words, the second detection unit 225 extracts an image with a different luminance value from the first luminance value B1 of the floor surface image DP11, the second luminance value B2 of the first image DP21 corresponding to the first object BJ1, and the third luminance value B3 of the second image DP22, from among the images included in the third depth image DP3, and thus detects the second object BJ2. For example, the second detection unit 225 extracts an image with a lower luminance value than the third luminance value B3 of the second image DP22, from among the images included in the third depth image DP3, and thus detects the second object BJ2.

In this way, the second detection unit 225 can detect the third image DP31 corresponding to the second object BJ2.

When the second detection unit 225 detects the second object BJ2, the notification unit 215 notifies the user that the second object BJ2 is detected. For example, the notification unit 215 causes the projector 30 to display, on the floor surface FL, a projection image showing that the second object BJ2 is detected, and thus notifies the user that the second object BJ2 is detected.

When the second detection unit 225 does not detect the second object BJ2, the notification unit 215 notifies the user that the second object BJ2 is not detected. For example, the notification unit 215 causes the projector 30 to display, on the floor surface FL, a projection image showing that the second object BJ2 is not detected, and thus notifies the user that the second object BJ2 is not detected.

Figure 8:
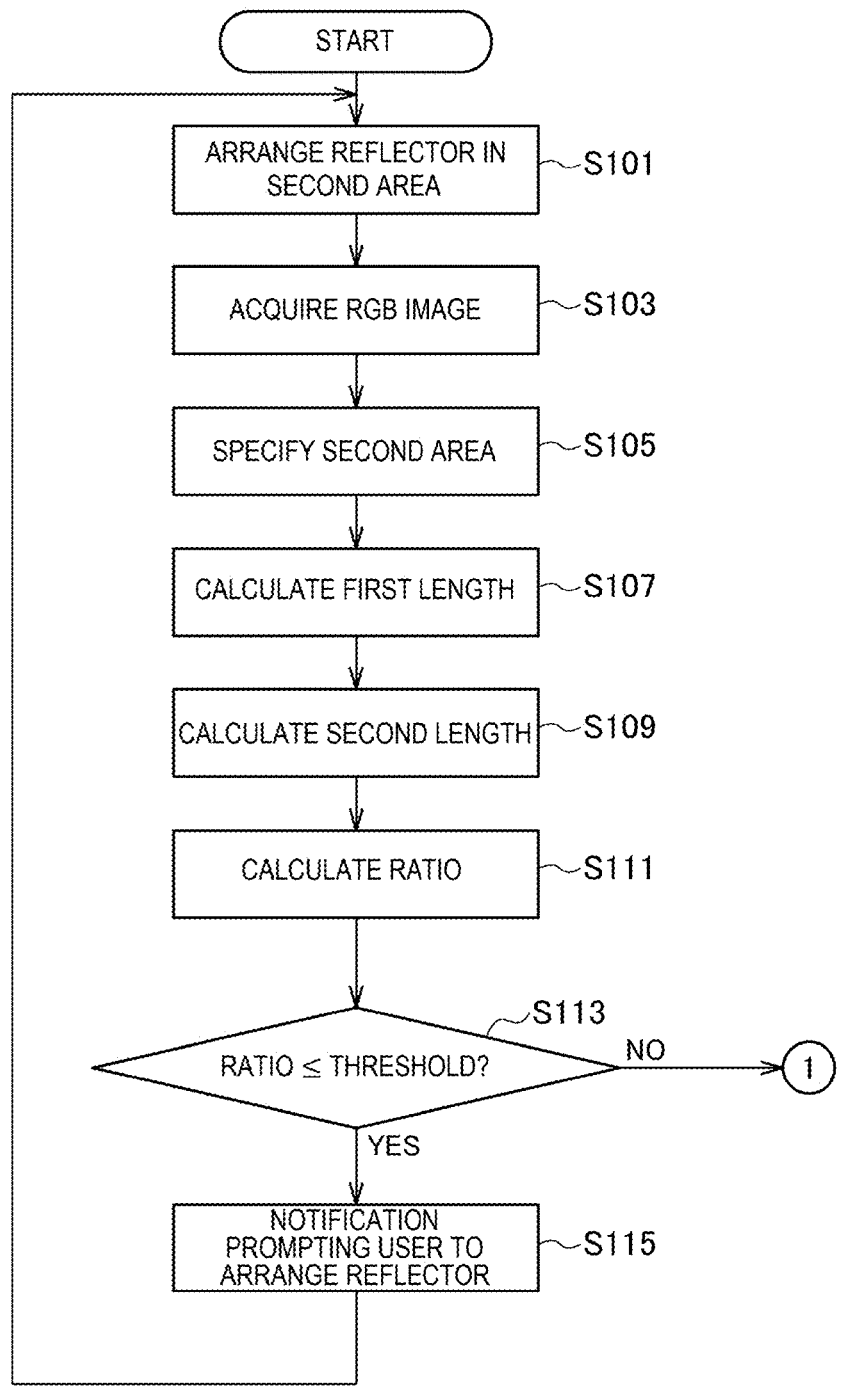
FIG. 8 is a flowchart showing an example of processing by the personal computer.
Figure 9:
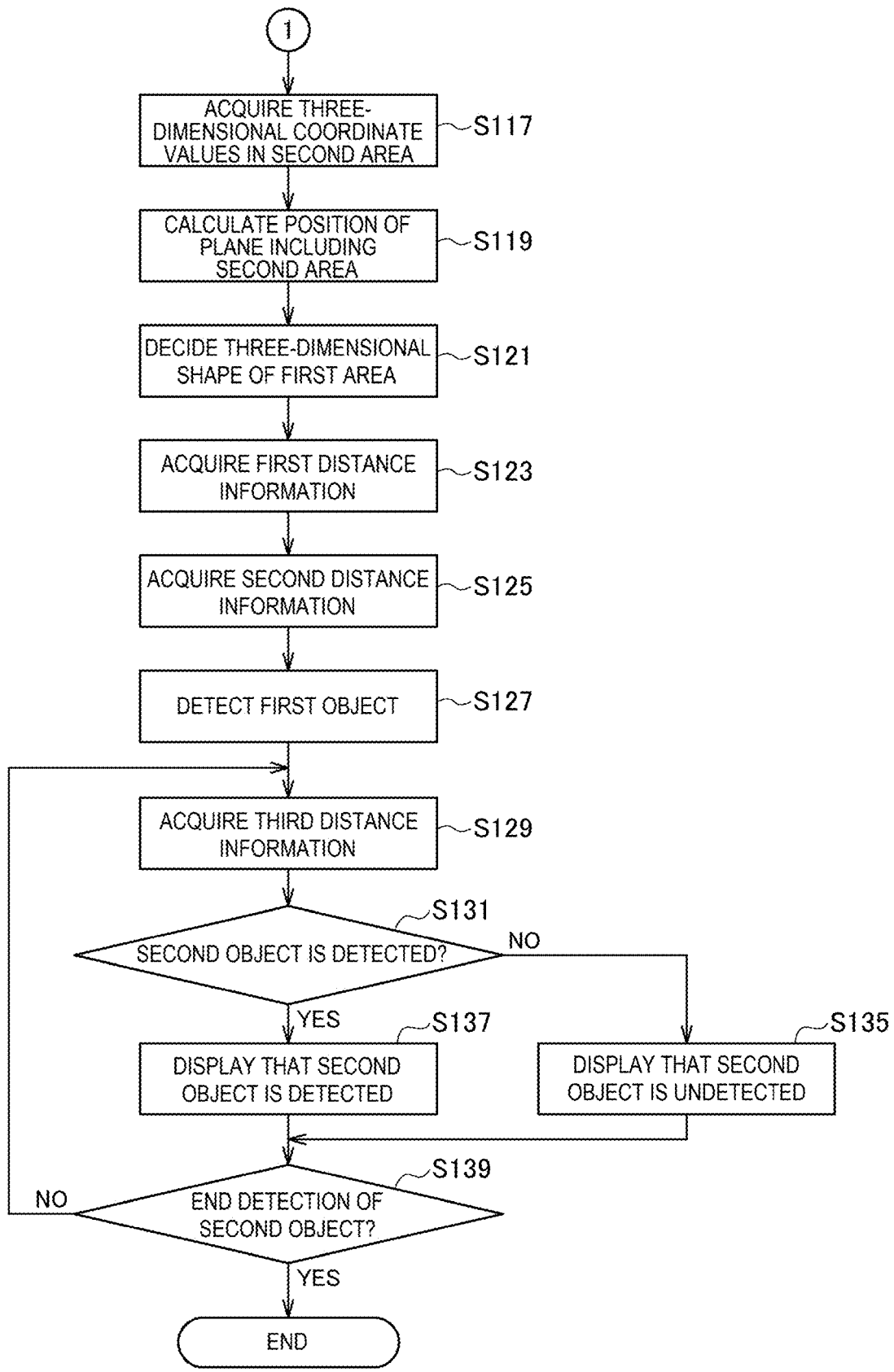
FIG. 9 is a flowchart showing an example of processing by the personal computer.

FIGS. 8 and 9 are flowcharts showing an example of processing by the personal computer 20.

First, as shown in FIG. 8, in step S101, the user arranges the reflector RF and the marker MK in the second area AR2.

Next, in step S103, the position specifying unit 216 acquires the RGB image CP from the RGB camera 12.

Next, in step S105, the position specifying unit 216 specifies the position corresponding to the second area AR2, in the RGB image CP.

Next, in step S107, the ratio determination unit 214 calculates the first length L1. The first length L1 represents the length in the X-axis direction of the first area AR1.

Next, in step S109, the ratio determination unit 214 calculates the second length L2. The second length L2 represents the length in the X-axis direction of the second area AR2.

Next, in step S111, the ratio determination unit 214 calculates the ratio RT.

Next, in step S113, the ratio determination unit 214 determines whether the ratio RT is equal to or lower than the threshold TH, or not.

When the ratio determination unit 214 determines that the ratio RT is equal to or lower than the threshold TH, that is, when YES in step S113, the processing goes to step S115.

In step S115, the notification unit 215 gives a notification prompting the user to install the reflector RF. Subsequently, the processing returns to step S101.

When the ratio determination unit 214 determines that the ratio RT is not equal to or lower than the threshold TH, that is, when NO in step S113, the processing goes to step S117 shown in FIG. 9.

As shown in FIG. 9, in step S117, the coordinate acquisition unit 211 acquires the three-dimensional coordinate values of two points in the second area AR2, based on the depth image DP.

Next, in step S119, the plane calculation unit 212 calculates the position of the plane PL including the second area AR2, based on the three-dimensional coordinate values of the two points in the second area AR2.

Next, in step S121, the shape decision unit 213 decides the position of the plane PL as the three-dimensional shape of the first area AR1.

Next, in step S123, the first acquisition unit 221 acquires the first distance information JL1 representing the three-dimensional shape of the first area AR1, based on the position of the plane PL.

Next, in step S125, the second acquisition unit 222 acquires the second distance information JL2 representing a three-dimensional shape in the first area AR1, based on the depth image DP. The second distance information JL2 corresponds to the second depth image DP2 generated by the depth camera 11 in the state where the first object BJ1 is arranged on the floor surface FL.

Next, in step S127, the first detection unit 223 detects the first object BJ1 in the first area AR1, based on the first distance information JL1 and the second distance information JL2. Specifically, the first detection unit 223 detects the first object BJ1 in the first area AR1, based on the first depth image DP1 and the second depth image DP2.

Next, in step S129, the third acquisition unit 224 acquires the third distance information JL3 representing a three-dimensional shape in the first area, based on the depth image DP. The third distance information JL3 corresponds to the third depth image DP3 generated by the depth camera 11 in the state where the first object BJ1 and the second object BJ2 are arranged on the floor surface FL.

Next, in step S131, the second detection unit 225 determines whether the second object BJ2 in the first area AR1 is detected or not, based on the second distance information JL2 and the third distance information JL3.

When the second detection unit 225 determines that the second object BJ2 is not detected, that is, when NO in step S131, the processing goes to step S135.

In step S135, the notification unit 215 notifies the user that the second object BJ2 is not detected. For example, the notification unit 215 causes the projector 30 to display, on the floor surface FL, a projection image showing that the second object BJ2 is not detected, and thus notifies the user that the second object BJ2 is not detected. Subsequently, the processing goes to step S139.

When the second detection unit 225 determines that the second object BJ2 is detected, that is, when YES in step S131, the processing goes to step S137.

In step S137, the notification unit 215 notifies the user that the second object BJ2 is detected. For example, the notification unit 215 causes the projector 30 to display, on the floor surface FL, a projection image showing that the second object BJ2 is detected, and thus notifies the user that the second object BJ2 is detected. Subsequently, the processing goes to step S139.

Next, in step S139, the control unit 21 determines whether the detection of the second object BJ2 is to end or not. For example, the control unit 21 accepts an operation from the user and determines whether the detection of the second object BJ2 is to end or not, based on the accepted operation.

When the control unit 21 determines that the detection of the second object BJ2 is not to end, that is, when NO in step S139, the processing returns to step S129. When the control unit 21 determines that the detection of the second object BJ2 is to end, that is, when YES in step S139, the processing subsequently ends.

As described with reference to FIGS. 8 and 9, the coordinate acquisition unit 211 acquires the three-dimensional coordinate values of two points in the second area AR2, based on the depth image DP. The plane calculation unit 212 calculates the position of the plane PL including the second area AR2, based on the three-dimensional coordinate values of the two points in the second area AR2. The shape decision unit 213 decides the position of the plane PL as the three-dimensional shape of the first area AR1. Therefore, when the three-dimensional coordinate values of two points in the second area AR2 can be acquired, three-dimensional coordinate values in the first area AR1 can be acquired with sufficient accuracy.

The reflector RF is arranged in the second area AR2. Therefore, the three-dimensional coordinate values of two points in the second area AR2 can be acquired accurately.

Also, the marker MK is arranged in the second area AR2. Therefore, the position of the second area AR2 in the RGB image CP can be easily specified.

A detection system 1 according to the second embodiment will now be described. The basic configuration of the detection system 1 according to the second embodiment is similar to that of the detection system 1 according to the first embodiment and therefore will not be described further in detail.

The first and second embodiments differ from each other in that the control unit 21 of the personal computer 20 in the detection system 1 according to the first embodiment has the second detection unit 225, whereas the control unit 21 of the personal computer 20 in the detection system 1 according to the second embodiment has a second detection unit 226 instead of the second detection unit 225.

Figure 10:
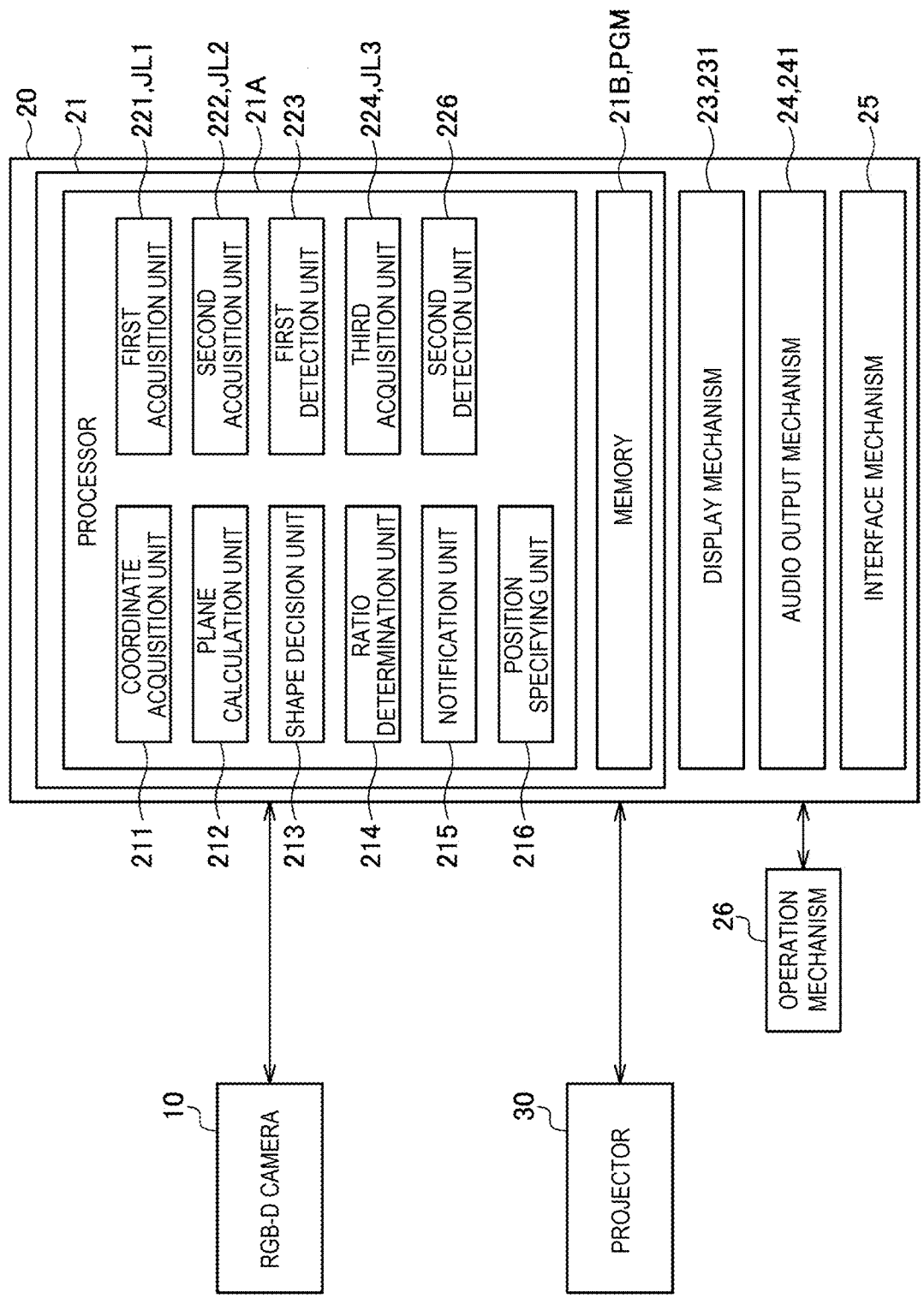
FIG. 10 shows an example of the configuration of a personal computer according to a second embodiment.

FIG. 10 shows an example of the configuration of the personal computer 20 according to the second embodiment.

The second detection unit 226 detects the second object BJ2 in the first area AR1, based on the first distance information JL1, the second distance information JL2, and the third distance information JL3.

The content of the processing by the second detection unit 226 will now be described more specifically with reference to FIG. 7.

First, the second detection unit 226 detects the first object BJ1 and the second object BJ2 in the first area AR1, based on the first depth image DP1 and the third depth image DP3. In other words, the second detection unit 226 extracts an image with a different luminance value from the first luminance value B1 of the floor surface image DP11, from among the images included in the third depth image DP3, and thus detects the first object BJ1 and the second object BJ2. For example, the second detection unit 226 extracts an image with a lower luminance value than the first luminance value B1 of the floor surface image DP11, from among the images included in the third depth image DP3, and thus detects the first object BJ1 and the second object BJ2.

Next, the second detection unit 226 detects the second object BJ2, which is different from the first object BJ1 detected by the first detection unit 223, in the first area AR1, based on the second depth image DP2 and the third depth image DP3.

In other words, the second detection unit 226 extracts the luminance value of the image corresponding to each of the first object BJ1 and the second object BJ2 detected by the second detection unit 226 based on the first depth image DP1 and the third depth image DP3, from among the images included in the third depth image DP3. Specifically, the second detection unit 226 extracts the second luminance value B2 of the first image DP21 corresponding to the first object BJ1, the third luminance value B3 of the second image DP22 corresponding to the first object BJ1, and the fourth luminance value B4 of the third image DP31 corresponding to the second object BJ2.

The second detection unit 226 then extracts the luminance value of the image corresponding to the first object BJ1 detected by the first detection unit 223 based on the first depth image DP1 and the second depth image DP2, from among the images included in the second depth image DP2. Specifically, the second detection unit 226 extracts the second luminance value B2 of the first image DP21 corresponding to the first object BJ1 in the first area AR1 and the third luminance value B3 of the second image DP22 corresponding to the first object BJ1.

Subsequently, the second detection unit 226 compares the second luminance value B2, the third luminance value B3, and the fourth luminance value B4 in the third depth image DP3, with the second luminance value B2 and the third luminance value B3 in the second depth image DP2, extracts the luminance value that differs between the second depth image DP2 and the third depth image DP3, and thus detects the second object BJ2 corresponding to the fourth luminance value B4.

In this way, the second detection unit 226 can detects the second object BJ2 in the first area AR1, based on the first depth image DP1, the second depth image DP2, and the third depth image DP3.

Figure 11:
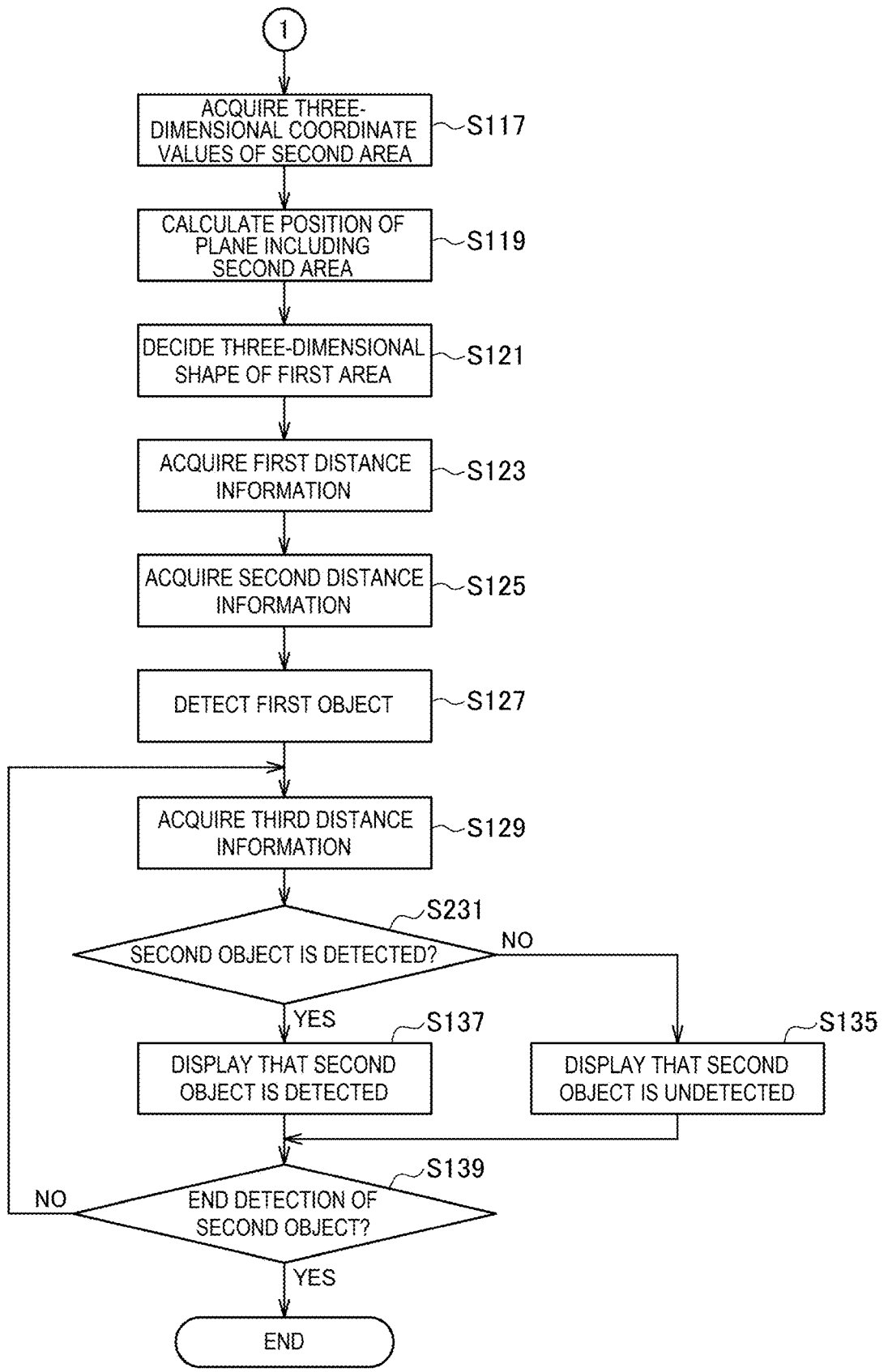
FIG. 11 is a flowchart showing an example of processing by the personal computer.

FIG. 11 is a flowchart showing an example of the processing by the personal computer 20 included in the detection system 1 according to the second embodiment. The processing in steps S117 to S129 is similar to the processing executed in the detection system 1 according to the first embodiment and therefore will not be described further.

After executing step S129, the personal computer 20 executes step S231. In step S231, the second detection unit 226 determines whether the second object BJ2 in the first area AR1 is detected or not, based on the first distance information JL1, the second distance information JL2, and the third distance information JL3.

When second detection unit 226 determines that the second object BJ2 is not detected, that is, when NO in step S231, the processing goes to step S135. When the second detection unit 226 determines that the second object BJ2 is detected, that is, when YES in step S231, the processing goes to step S137.

The processing in step S135 and from step S137 onward is similar to the processing executed in the detection system 1 according to the first embodiment and therefore will not be described further.

As described above with reference to FIGS. 1 to 11, the detection method according to the embodiments is a detection method for detecting the three-dimensional shape of the first area AR1 by the infrared projector 13 and the depth camera 11. The first area AR1 includes the second area AR2, which is smaller than the first area AR1. The detection method includes: acquiring the three-dimensional coordinate values of at least two points in the second area AR2, based on the depth image DP by the depth camera 11; calculating the position of the plane PL including the second area AR2, based on the three-dimensional coordinate values of the two points; and deciding the position of the plane PL as the three-dimensional shape of the first area AR1.

That is, the three-dimensional coordinate values of two points in the second area AR2 are acquired, based on the depth image DP, and the position of the plane PL including the second area AR2 is calculated, based on the three-dimensional coordinate values of the two points in the second area AR2. The position of the plane PL is decided as the three-dimensional shape of the first area AR1.

Therefore, when the three-dimensional coordinate values of two points in the second area AR2 can be acquired, three-dimensional coordinate values in the first area AR1 can be acquired with sufficient accuracy.

The second area AR2 is an area where the reflector RF reflecting infrared light is installed.

Therefore, the three-dimensional coordinate values of two points in the second area AR2 can be accurately acquired, based on the depth image DP. Thus, three-dimensional coordinate values in the first area AR1 can be acquired with sufficient accuracy.

The detection method also includes: determining whether the ratio RT of the size of the second area AR2 to the size of the first area AR1 is equal to or lower than the threshold TH, or not; and giving a notification prompting the user to install the reflector RF when the ratio RT is equal to or lower than the threshold TH.

That is, when the ratio RT of the size of the second area AR2 to the size of the first area AR1 is equal to or lower than the threshold TH, a notification promoting the user to install the reflector RF is given.

Therefore, the second area AR2 can be set to a proper size. Thus, three-dimensional coordinate values in the first area AR1 can be acquired with sufficient accuracy.

The detection method also includes: determining whether the ratio RT of the size of the second area AR2 to the size of the first area AR1 is equal to or lower than the threshold TH, or not; and notifying the user of a possibility that the detection accuracy for the three-dimensional shape of the first area AR1 is low, when the ratio RT is equal to or lower than the threshold TH.

That is, when the ratio RT of the size of the second area AR2 to the size of the first area AR1 is equal to or lower than the threshold TH, the user is notified of a possibility that the detection accuracy for the three-dimensional shape of the first area AR1 is low.

Thus, the user can recognize the possibility that the detection accuracy for the three-dimensional shape of the first area AR1 is low. Therefore, the convenience of the user can be improved.

For example, when the low detection accuracy for the three-dimensional shape of the first area AR1 does not pose any problem, the user can use the detected three-dimensional shape of the first area AR1. Meanwhile, for example, when the low detection accuracy for the three-dimensional shape of the first area AR1 is not preferable, the user can increase the size of the second area AR2 and thus improve the detection accuracy for the three-dimensional shape of the first area AR1.

The detection method also includes: accepting an operation of designating an area corresponding to the second area AR2 in the depth image DP of the first area AR1 by the infrared projector 13 and the depth camera 11.

Since the operation of designating an area corresponding to the second area AR2 in the depth image DP of the first area AR1 is accepted, the second area AR2 can be easily specified without arranging the marker MK. Therefore, the convenience of the user can be improved.

The detection method also includes: causing the RGB camera 12 to pick up an image of the first area AR1 and acquiring the RGB image CP from the RGB camera 12; and specifying a position corresponding to the second area AR2 in the RGB image CP.

Since the position corresponding to the second area AR2 is specified in the RGB image CP, the position corresponding to the second area AR2 can be accurately specified. Therefore, the detection accuracy for the three-dimensional shape of the first area AR1 can be improved.

The detection method also includes: acquiring the first distance information JL1 representing the three-dimensional shape of the first area AR1, based on the position of the plane PL; acquiring the second distance information JL2 representing a three-dimensional shape in the first area AR1, based on the depth image DP of the first area AR1 by the infrared projector 13 and the depth camera 11, after acquiring the first distance information JL1; and detecting the first object BJ1 in the first area AR1, based on the first distance information JL1 and the second distance information JL2.

That is, the first object BJ1 in the first area AR1 is detected, based on the first distance information JL1 representing the three-dimensional shape of the first area AR1 and the second distance information JL2 representing the three-dimensional shape in the first area AR1 after the first distance information JL1 is acquired. For example, as described with reference to FIG. 7, the first object BJ1 in the first area AR1 is detected, based on the first depth image DP1 and the second depth image DP2. The first depth image DP1 corresponds to the first distance information JL1. The second depth image DP2 corresponds to the second distance information JL2.

Thus, the first object BJ1 in the first area AR1 can be accurately detected.

The detection method also includes: acquiring the third distance information JL3 representing the three-dimensional shape in the first area AR1, based on the depth image DP of the first area AR1 by the infrared projector 13 and the depth camera 11, after acquiring the second distance information JL2; and detecting the second object BJ2, which is different from the first object BJ1, in the first area AR1, based on the second distance information JL2 and the third distance information JL3.

That is, the second object BJ2, which is different from the first object BJ1, in the first area AR1, is detected, based on the second distance information JL2 and the third distance information JL3 representing the three-dimensional shape in the first area AR1 after the second distance information JL2 is acquired. For example, as described with reference to FIG. 7, the second object BJ2 in the first area AR1 is detected, based on the second depth image DP2 and the third depth image DP3. The second depth image DP2 corresponds to the second distance information JL2. The third depth image DP3 corresponds to the third distance information JL3.

Thus, the second object BJ2 in the first area AR1 can be accurately detected.

Also, the second object BJ2, which is different from the first object BJ1, in the first area AR1, may be detected, based on the first distance information JL1 in addition to the second distance information JL2 and the third distance information JL3 representing the three-dimensional shape in the first area AR1 after the second distance information JL2 is acquired.

The detection system 1 according to the embodiments has the infrared projector 13, the depth camera 11, and the personal computer 20 and is configured to detect the three-dimensional shape of the first area AR1. The first area AR1 includes the second area AR2, which is smaller than the first area AR1. The personal computer 20 executes: acquiring the three-dimensional coordinate values of at least two points in the second area AR2, based on the depth image DP of the first area AR1 by the infrared projector 13 and the depth camera 11; calculating the position of the plane PL including the second area AR2, based on the three-dimensional coordinate values of the two points; and deciding the position of the plane PL as the three-dimensional shape of the first area AR1.

Therefore, the detection system 1 according to the embodiments achieve effects similar to those of the detection method according to the embodiments.

The foregoing embodiments are preferred embodiments. However, the present disclosure is not limited to the foregoing embodiments and can be implemented with various modifications without departing from the spirit and scope of the present disclosure.

In the embodiments, the case where the "distance measuring sensor" and the image pickup device generating a picked-up image are formed by an RGB-D camera is described. However, this is not limiting. For example, the "distance measuring sensor" and the image pickup device generating a picked-up image may be formed as separate units.

In the embodiments, the case where the "information processing device" is the personal computer 20 is described. However, this is not limiting. The "information processing device" may be a tablet terminal, smartphone or the like.

In the embodiments, the case where the detection system 1 has the detection device 10, the personal computer 20, and the projector 30, is described. However, this is not limiting. For example, the detection system 1 may be formed by the detection device 10 and the personal computer 20. That is, the detection system 1 may not have the projector 30.

In the embodiments, the case where the first area AR1 is included in the floor surface FL is described. However, this is not limiting. The first area AR1 may be included in any planar member, structure or the like. For example, the first area AR1 may be included in a wall surface. Also, for example, the first area AR1 may be included in a ceiling surface.

In the embodiments, the personal computer 20 is coupled to each of the detection device 10 and the projector 30 in such a way as to be able to perform wired communication with each other. However, this is not limiting. The personal computer 20 may be coupled to each of the detection device 10 and the projector 30 in such a way as to be able to perform wireless communication with each other such as Bluetooth (trademark registered) or Wi-Fi (trademark registered).

In the embodiment, the case where the control unit 21 of the personal computer 20 has the coordinate acquisition unit 211, the plane calculation unit 212, the shape decision unit 213, the ratio determination unit 214, the notification unit 215, the position specifying unit 216, the first acquisition unit 221, the second acquisition unit 222, the first detection unit 223, the third acquisition unit 224, and the second detection unit 225, is described. However, this is not limiting.

For example, a control unit, not illustrated, of the projector 30 may have the coordinate acquisition unit 211, the plane calculation unit 212, the shape decision unit 213, the ratio determination unit 214, the notification unit 215, the position specifying unit 216, the first acquisition unit 221, the second acquisition unit 222, the first detection unit 223, the third acquisition unit 224, and the second detection unit 225. In this case, the detection system 1 need not have the personal computer 20.

Each of the functional units shown in FIG. 3 represents a functional configuration and is not particularly limited to any specific installation form. That is, a piece of hardware corresponding individually to each of the functional units need not necessarily be installed. A single processor can execute a program to implement functions of a plurality of functional units. A part of the functions implemented by software in the embodiments may be implemented by hardware and a part of the functions implemented by hardware may be implemented by software. Also, the specific details of the configuration of each of the other parts of the personal computer 20 can be arbitrarily changed without departing from the spirit and scope of the present disclosure.

The processing steps in the flowcharts shown in FIGS. 8 and 9 are provided by dividing the processing according to the main processing content in order to facilitate the understanding of the processing by the personal computer 20. The processing by the personal computer 20 is not limited by the way the processing is divided into processing steps and the terms used to refer to each processing step shown in the flowcharts of FIGS. 8 and 9. The processing can be divided into many more processing steps and can also be divided in such a way that one processing step includes more processing. The order of processing in the flowcharts is not limited to the illustrated example, either.

The detection method for the detection system 1 can be implemented by causing the processor 21A of the personal computer 20 to execute the control program PGM corresponding to the detection method for the detection system 1. The control program PGM can be recorded in a computer-readable recording medium. As the recording medium, a magnetic or optical recording medium or a semiconductor memory device can be used.

Specifically, a portable recording medium such as a flexible disk, an HDD, a CD-ROM (compact disc read-only memory), a DVD, a Blu-ray (trademark registered) disc, a magneto-optical disk, a flash memory or a card-type recording medium, or a fixed recording medium can be employed. The recording medium may also be a non-volatile storage device such as a RAM, a ROM or an HDD that is an internal storage device in the image processing device.

Also, the control program PGM corresponding to the detection method for the detection system 1 may be stored in a server device or the like and may be downloaded into the personal computer 20 from the server device, thus implementing the detection method for the detection system 1.

In the embodiments, the case where the reflector RF is installed in the second area AR2 by the user is described. However, this is not limiting. The second area AR2 may be a planar area that reflects infrared light and where three-dimensional coordinate values can be acquired, based on the depth image DP acquired by the depth camera 11. For example, the first area AR1 may be a floor surface and an area formed of a material sufficiently reflecting infrared light, in the first area AR1, may be defined as the second area AR2. Also, in the first area AR1, an area that cannot sufficiently reflect infrared light to the depth camera 11 due to the influence of the relative angle between the floor surface, which is the first area AR1, and the depth camera 11, may be not defined as the second area AR2, and only an area that can sufficiently reflect infrared light to the depth camera 11 may be defined as the second area AR2. Also, for example, when the first object BJ1 is included in the first area AR1 as shown in FIG. 5, a planar area reflecting infrared light where the first object BJ1 is not installed may be defined as the second area AR2.

What is claimed is:

1. A detection method comprising:
   measuring a first area with an infrared distance measuring sensor;
   acquiring measured values of the first area;
   acquiring three-dimensional coordinate values of at least two points in a second area included in the first area, the second area is smaller than the first area, based on the measured values;
   calculating a position of a plane including the second area, based on the three-dimensional coordinate values of the at least two points;
   deciding the position of the plane as a three-dimensional shape of the first area;
   determining whether a ratio of a size of the second area to a size of the first area is equal to or lower than a threshold; and
   notifying a user of a possibility that a detection accuracy for the three-dimensional shape of the first area is low, when the ratio is equal to or lower than the threshold.

2. The detection method according to claim 1, wherein the second area is an area where a reflector is installed, and
   the reflector reflects infrared light.

3. The detection method according to claim 2, further comprising:
   determining whether a ratio of a size of the second area to a size of the first area is equal to or lower than a threshold; and
   notifying a user to install the reflector when the ratio is equal to or lower than the threshold.

4. The detection method according to claim 1, further comprising:
   accepting an operation of designating a measured value corresponding to the second area in the measured values of the first area.

5. The detection method according to claim 1, further comprising:
   acquiring a picked-up image by picking up an image of the first area; and
   specifying a position corresponding to the second area in the picked-up image.

6. A detection method comprising:
   measuring a first area with an infrared distance measuring sensor;
   acquiring measured values of the first area;
   acquiring three-dimensional coordinate values of at least two points in a second area included in the first area, the second area is smaller than the first area, based on the measured values;
   calculating a position of a plane including the second area, based on the three-dimensional coordinate values of the at least two points;
   deciding the position of the plane as a three-dimensional shape of the first area;

acquiring first distance information representing the three-dimensional shape of the first area, based on the position of the plane;

acquiring second distance information representing a three-dimensional shape in the first area, based on a measured value by the infrared distance measuring sensor, after acquiring the first distance information; and detecting a first object in the first area, based on the first distance information and the second distance information.

7. The detection method according to claim 6, further comprising:

acquiring third distance information representing a three-dimensional shape in the first area, based on a measured value by the infrared distance measuring sensor, after acquiring the second distance information; and detecting a second object that is different from the first object in the first area, based on the second distance information and the third distance information.

8. A detection system comprising:

an infrared distance measuring sensor configured to measure a first area; and an information processing device executing:

acquiring measured values of the first area measured with the infrared distance measuring sensor;

acquiring three-dimensional coordinate values of at least two points in a second area included in the first area, based on the measured values, the second area is smaller than the first area;

calculating a position of a plane including the second area, based on the three-dimensional coordinate values of the at least two points;

deciding the position of the plane as a three-dimensional shape of the first-area;

determining whether a ratio of a size of the second area to a size of the first area is equal to or lower than a threshold; and notifying a user of a possibility that a detection accuracy for the three-dimensional shape of the first area is low, when the ratio is equal to or lower than the threshold.

* * * * *